(12) United States Patent
Thomas et al.

(10) Patent No.: US 7,672,446 B2
(45) Date of Patent: Mar. 2, 2010

(54) ECHO PROCESSING METHOD AND DEVICE

(75) Inventors: Jean-Philippe Thomas, Trevou Treguignec (FR); Olivier Durand, Mignaloux-Beauvoir (FR)

(73) Assignee: France Telecom SA, Paris (FR)

( * ) Notice: Subject to any disclaimer, the term of this patent is extended or adjusted under 35 U.S.C. 154(b) by 49 days.

(21) Appl. No.: 10/560,523

(22) PCT Filed: Jun. 8, 2004

(86) PCT No.: PCT/EP2004/006239

§ 371 (c)(1),
(2), (4) Date: Mar. 17, 2006

(87) PCT Pub. No.: WO2004/112370

PCT Pub. Date: Dec. 23, 2004

(65) Prior Publication Data

US 2006/0177045 A1  Aug. 10, 2006

(30) Foreign Application Priority Data

Jun. 13, 2003  (FR) .................................. 03 07167

(51) Int. Cl.
*H04M 9/08* (2006.01)
*H04M 1/00* (2006.01)
*H04B 3/20* (2006.01)

(52) U.S. Cl. ........................... 379/406.01; 379/399.01; 379/406.05; 379/406.06; 381/66

(58) Field of Classification Search ................ 381/71.1, 381/66; 379/399.01, 466.01, 406.01, 406.05, 379/406.06, 406.08, 406.02
See application file for complete search history.

(56) References Cited

U.S. PATENT DOCUMENTS

| 6,496,581 | B1 | 12/2002 | Finn et al. |
| 6,937,723 | B2 * | 8/2005 | Boland et al. .......... 379/406.06 |
| 7,006,624 | B1 * | 2/2006 | Philipsson et al. ..... 379/388.03 |
| 2002/0071573 | A1 | 6/2002 | Finn |
| 2003/0026437 | A1 * | 2/2003 | Janse et al. .................. 381/71.4 |
| 2003/0123674 | A1 * | 7/2003 | Boland ........................ 381/66 |
| 2005/0047609 | A1 | 3/2005 | Buchner et al. |

FOREIGN PATENT DOCUMENTS

| DE | 10153188 | 3/2003 |
| EP | 0903726 | 3/1999 |

\* cited by examiner

*Primary Examiner*—Vivian Chin
*Assistant Examiner*—George C Monikang
(74) *Attorney, Agent, or Firm*—Lowe Hauptman Ham & Berner LLP

(57) ABSTRACT

The invention concerns a method and device for processing echo between at least two communication devices in order to attenuate, in a picked-up signal of a communication device comprising at least one microphone, the components of the signal broadcasted by at least one other communication device comprising at least one loudspeaker, characterised in that the echo processing device comprises:

means for receiving, by means of a connection with at least one other device, information representing at least one broadcasted signal of at least one other communication device, means for modifying the picked-up signal of the communication device according to information representing the broadcasted signal and information representing the coupling separating a loudspeaker of the said at least one other communication device from the microphone of the communication device.

25 Claims, 9 Drawing Sheets

| Distance (m) | Pulse | Coefficient |
|---|---|---|
| 0.5 | 15 | 1 |
| 1 | 30 | 0.5 |
| 1.5 | 45 | .37 |
| 2 | 60 | 0.25 |
| 4 | 120 | 0.12 |
| 8 | 235 | 0.07 |
| >10 | 300 | 0 |

ECHO PROCESSING METHOD AND DEVICE

RELATED APPLICATIONS

The present application is a national phase application of PCT/EP2004/006239 filed Jun. 8, 2004 which is based on, and claims priority from, French Application Number 03 07167, filed Jun. 13, 2003, the entire disclosures of which are hereby incorporated by reference.

FIELD OF THE INVENTION

The present invention concerns an acoustic echo processing device and method intended to attenuate, in a signal picked up, echo components of a broadcasted signal.

BACKGROUND ART

More particularly, the invention is situated in the field of communications systems of the multichannel type.

Acoustic echo exists mainly in certain types of communication where the terminal of a distant user comprises one or more loudspeakers substituted for the earpiece and one or more microphones. It is a question for example of audio conference equipment or handsets functioning in "hands free" mode such as mobile telephones. Without special precautions, the sound emitted by the loudspeaker undergoes multiple reflections (against walls, the ceiling, etc) constituting a number of different echoes that are picked up by the microphone in the same way as the useful speech. The assembly consisting of the loudspeaker, the microphone and their physical environment thus constitutes an echo generating system.

In the case of a multichannel device, an echo cancelling system comprises N signal reception channels comprising a loudspeaker Hpi (i=1, 2, . . . ,N) and M sound pickup channels, each sound channel comprising a set of microphones MCj (j=1, 2, . . . ,M). This system thus comprises N*M acoustic channels and N*M echo cancellation devices II (i,j).

In the context of the use of a plurality of audio conference equipments or handsets functioning in "hands free" mode in the same premises, cross echo phenomena arise.

Thus, if several persons situated in the same premises close to one another are in "hands free" telephone communication with distant interlocutors, the signals reproduced by the loudspeaker of each telephone equipment are picked up by the microphone of each telephone equipment present in the premises and thus retransmitted to each distant caller. At the "hands free" telephone equipment, no echo cancellation is made on the signals reproduced by the loudspeakers of the other telephone handsets close to the telephone equipment. This appreciably interferes with communication and makes the use of several "hands free" telephone equipments impossible in the same premises.

Thus the echo correction mechanisms of the prior art do not correctly correct echoes when many communication devices close to one another are functioning simultaneously.

SUMMARY OF THE INVENTION

The aim of the invention is to solve the aforementioned problem by proposing a device for processing echo between at least two communication devices in order to attenuate, in a signal picked up by a communication device comprising at least one microphone, the components of a signal broadcasted from at least one other communication device comprising at least one loudspeaker, characterised in that it comprises:

means for receiving, by means of a connection with at least one other device, information representing at least one broadcasted signal from at least one other communication device, means for modifying the signal picked up by the communication device from information representing the broadcasted signal, the broadcasted signal being weighted by a coefficient representing the coupling separating a loudspeaker of the said at least one other communication device from the microphone of the communication device.

Correspondingly, the invention proposes a method of echo processing between at least two communication devices in order to attenuate, in a signal picked up by a communication device comprising at least one microphone, the components of a signal broadcasted from at least one other communication device comprising at least one loudspeaker, characterised in that it comprises the steps of:

receiving, by means of a connection with at least one other device, information representing at least one broadcasted signal from at least one other communication device, modifying the signal picked up by the communication device according to information representing the broadcasted signal, the broadcasted signal being weighted by a coefficient representing the coupling separating a loudspeaker on the said at least one other communication device from the microphone of the communication device.

Thus many communication devices situated close to one another can function simultaneously without being interfered by the sound signals generated by the other communication devices.

In addition, by virtue of the information representing the coupling existing between a loudspeaker and a microphone, the correction takes account of the attenuation, which is function of the coupling, of the sound signals emitted by the other communication devices.

Thus the signal picked up is modified precisely, and the quality of the communication is greatly improved.

More precisely, the echo processing device is included in the communication device.

Thus the cost of the echo processing device is reduced. Since the communication device already comprises certain components, some can also be used by the echo processing device.

More particularly, an echo control is made between at least one of the loudspeakers and at least one microphone of the communication device.

Thus the echo attenuations are carried out distinctly and in a simple fashion. The sound signals issued from other communication devices are treated by a simple and effective modification of the signal picked up by the communication device. The sound signals issued from the loudspeakers of the communication device with a greater energy than the sound signals from the other devices are processed by an echo control means that is more precise but more complex.

By making several types of correction according to the origin of the sound signal from the loudspeaker of the communication device or from the loudspeakers of the other communication devices in the same premises, the echo cancellation is optimum whilst remaining simple to implement.

More precisely, the information received representing at least one broadcasted signal from at least one other communication device have previously been weighted by a coefficient representing the coupling separating a loudspeaker of the said at least one other communication device and the microphone of the communication device.

In addition, the signal picked up is modified according to the weighted broadcasted signal issued from at least one other communication device, in the echo control reference signal of the communication device.

Thus the received signal requires no particular processing, and the echo processing tasks are therefore reduced. The echo processing is then carried out on a broadcasted signal already weighted by a coefficient representing the coupling and this distance does not need to be considered in the modification of the signal picked up.

The invention also concerns a device for processing echo between at least two communication devices in order to attenuate the components of a broadcasted signal of at least one communication device comprising at least one loudspeaker, in a signal picked up from another communication device comprising at least one microphone, characterised in that it comprises:

means for obtaining information representing the broadcasted signal of the communication device,
  means for transferring the information obtained, through a connection with the at least one other communication device.

Correspondingly, the invention proposes a method of processing echo between at least two communication devices in order to attenuate the components of a broadcasted signal of at least one communication device comprising at least one loudspeaker, in a signal picked up from another communication device comprising at least one microphone, characterised in that it comprises the steps of:

obtaining information representing the broadcasted signal of the communication device,
  transferring the information obtained through a connection with the at least one other device.

Thus the other communication device receives information representing the broadcasted signal of the communication device and it can then correct the audible nuisances generated by the broadcasted signal of the communication device.

The quality of the received signal then being improved, it is then possible to use multiple "hands free" communication devices in the same premises.

Preferentially, information representing the coupling separating at least one loudspeaker of the said at least one communication device from the microphone of the other communication device are obtained.

In addition, the information representing the broadcasted signal of the communication device is weighted by coefficients associated with the information representing the coupling separating at least one loudspeaker of the said at least one communication device from the microphone of the other communication device.

Thus the received signal is corrected precisely by taking account of the coupling of the sound sources.

More precisely, the number of other communication devices and the number of loudspeakers of the other communication devices are determined.

Thus, since the environment in which the echo processing device is situated in known, it is then possible to know all the sound sources generating interference on the communications.

More precisely, at least one predetermined audible signal is generated, information representing the reception of the audible signal by at least the other device is received through at least one connection with the at least one other communication device, and the distance separating the loudspeaker of the said communication device from the microphone of at least one other communication device is determined.

Thus the task of the user is simplified and he no longer needs to be preoccupied with measuring the distance separating him from each other device.

In addition, the determination of the distance being automatic, distance measurements can be made periodically and it can thus take into account the mobility of certain communication devices.

The invention also concerns a computer program stored on an information medium, the said program comprising instructions for implementing the methods succinctly described, when they are loaded into and executed by a computer system.

BRIEF DESCRIPTION OF THE DRAWINGS

The characteristics of the invention mentioned above, as well as others, will emerge more clearly from a reading of the following description of an example embodiment, the said description being given in relation to the accompanying drawings, amongst which.

DETAILED DESCRIPTION OF THE DRAWINGS

Figure 1:
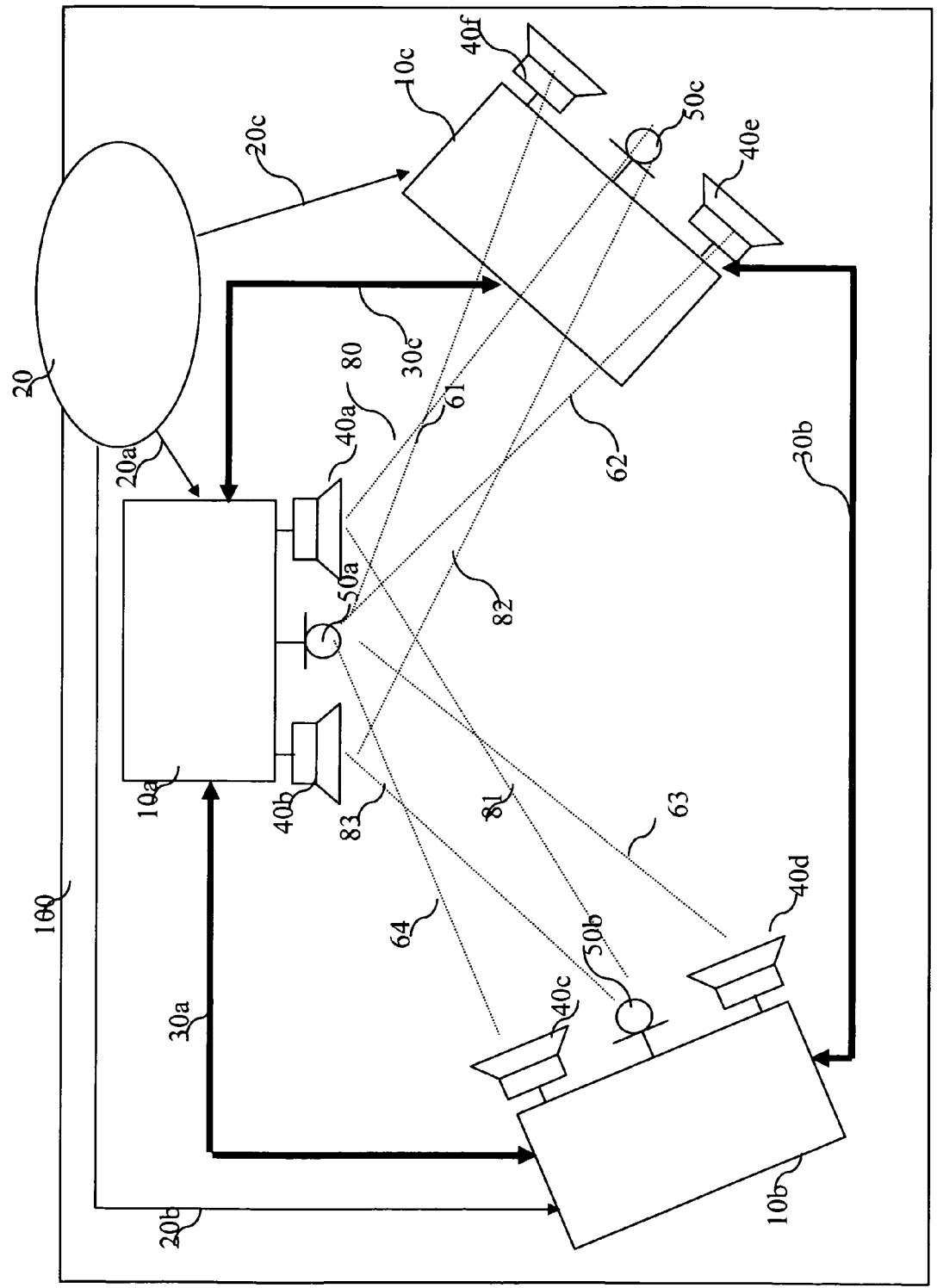
FIG. 1 depicts a first variant of a communication system according to the invention.

FIG. 1 depicts a first variant of a communication system according to the invention.

The communication system comprises, according to the variant, for example three communication devices 10a, 10b and 10c placed in a premises or room 100. These are for example audio conference or telephone equipments functioning in "hands free" mode such as mobile telephones.

The basic idea of the invention consists, for each communication device, in obtaining the signal reproduced by the loudspeaker of each of the other communication devices. This signal is weighted by a coefficient representing the coupling between the microphone of the device obtaining the signal and the loudspeaker of each of the other communication devices. The signal issued by the microphone of the device is modified according to the coefficients and the signals reproduced by the loudspeakers of each of the other communication devices.

Coupling, between a microphone of a communication device obtaining a signal and the loudspeaker of another communication device, means the distance separating the microphone of the communication device obtaining a signal and the loudspeaker of the other communication device.

The distance according to the invention is the direct and/or indirect distance between the microphone of the communication device and the loudspeaker of the other communication device. The indirect distance is the distance travelled by the acoustic wave, which takes account of the various multiple paths and reflections thereof before arriving at the microphone of the communication device.

The communication devices 10a, 10b and 10c are connected to a network 20 by respective connections 20a, 20b and 20c.

The network 20 is for example a telecommunication network of a telecommunication operator such as a switched telephone network, of an ISDN network type (Integrated-Services Digital Network) or a cellular telephone communication network such as a GSM network (Global System for Mobile communications), UMTS (Universal Mobile Telecommunications System), GPRS (General Packet Radio Services) etc.

The network 20 can also for example be a local network of the Ethernet type of a company, connected to an external network of the Internet type.

The network 20 can also be a wireless telephone network or a cabled telephone network connected to an external network of the switched telephone network (STN) type.

The communication devices 10 can communicate with one another or with other distant interlocutors through the network 20.

The communication device 10a comprises two loudspeakers denoted 40a and 40b. It should be noted that the invention can also be implemented with a single loudspeaker or more than two loudspeakers.

The loudspeakers 40a and 40b reproduce for example the stereo sound signal broadcasted by an interlocutor to the user of the communication device 10a.

The communication device 10a also comprises a microphone 50a which receives the sound signal picked up in order to reproduce it to the caller.

It should be noted here that the microphone 50a is, in one particular example, an acoustic antenna consisting of a plurality of microphones.

All the communication devices 10 in the premises 100 are connected to one another through connections 30. Thus, according to the example in FIG. 1, the communication device 10a is connected to the other communication devices 10b and 10c respectively through connections 30a and 30c. The connection 30a allows the transfer, from the communication device 10b to the communication device 10a, of the broadcasted signals reproduced by the loudspeakers 40c, 40d and previously weighted by a coefficient representing their respective couplings with the microphone 50a. The connection 30a also allows the transfer, from the communication device 10a to the communication device 10b, of the broadcasted signals reproduced by the loudspeakers 40a, 40b and previously weighted by a coefficient representing their respective couplings with the microphone 50b.

The connection 30c allows the transfer, from the communication device 30c to the communication device 10a, of the broadcasted signals reproduced by the loudspeakers 40e, 40f and previously weighted by a coefficient representing their respective couplings with the microphone 50a. It also allows the transfer, from the communication device 10a to the communication device 10c, of the broadcasted signals reproduced by the loudspeakers 40a, 40b and previously weighted by a coefficient representing their respective couplings with the microphone 50c.

The communication device 10b is connected to the communication device 10c through a connection 30b. This connection allows the transfer, from the communication device 10b to the communication device 10c, of the broadcasted signal reproduced by the loudspeakers 40c, 40d and previously weighted by a coefficient representing their respective couplings with the microphone 50c. This connection also allows the transfer, from the communication device 10c to the communication device 10b, of the broadcasted signals reproduced by the loudspeakers 40e, 40f and previously weighted by a coefficient representing their respective couplings with the microphone 50b.

The connections 30 are for example connections making it possible to convey data in digital form such as connections of the Ethernet type. These connections 30 can also be connections of the RS232 type. Naturally, any other type of connection can be envisaged.

The communication device 10b comprises two loudspeakers 40c and 40d and a microphone 50b.

It should be noted here that the microphone 50b is in one particular example an acoustic antenna consisting of a plurality of microphones.

The communication device 10c comprises two loudspeakers 40e and 40f and a microphone 50c.

It should be noted here that the microphone 50b is in one particular example an acoustic antenna consisting of a plurality of microphones.

The segments in dotted lines 61, 62, 63 and 64 represent the path of the direct sound waves emitted respectively by the loudspeakers 40f, 40e of the communication device 10c and by the loudspeakers 40d and 40c of the communication device 10b, to the microphone 50a of the communication device 10a.

The segments in dotted lines 80 and 81 depict the path of the direct sound waves emitted by the loudspeaker 40a of the communication device 10a respectively to the microphones 50c and 50b of the communication devices 10c and 10b.

The segments in dotted lines 82 and 83 represent the path of the direct sound waves emitted by the loudspeaker 40b of the communication device 10a respectively to the microphones 50c and 50d of the communication devices 10c and 10b.

Figure 5:
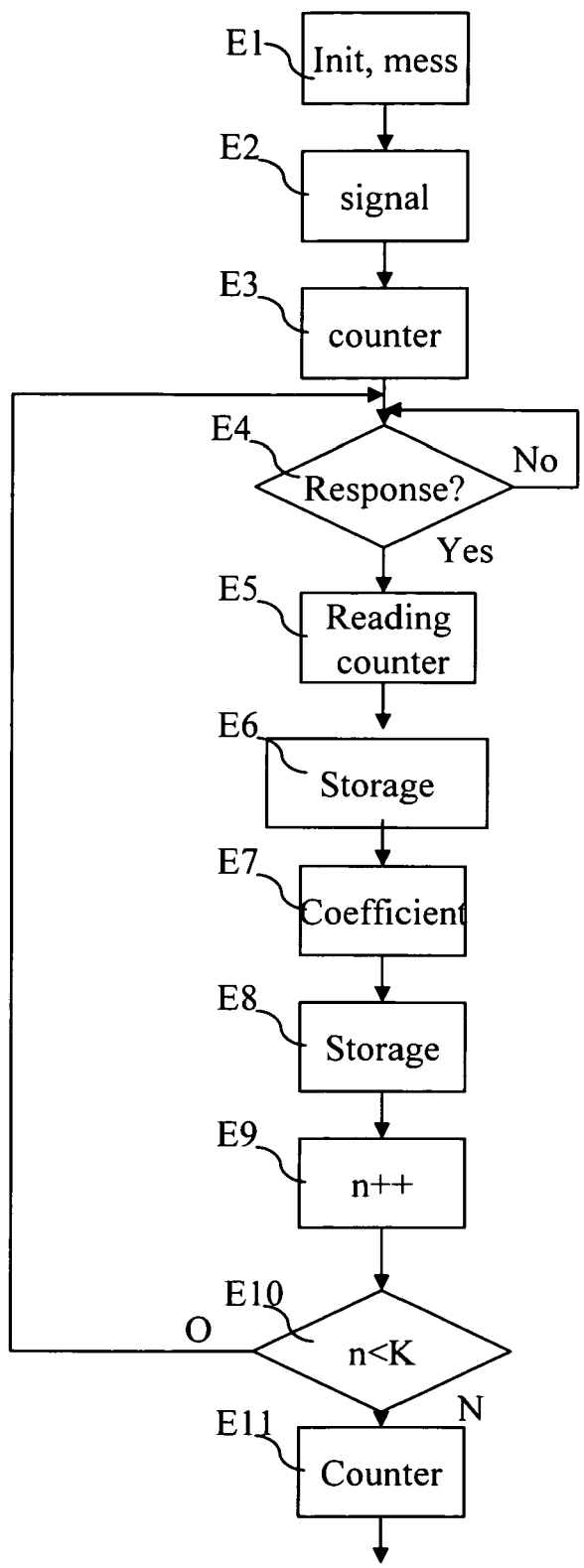
FIG. 5 depicts an automatic coupling determination algorithm, used according to a variant of the invention, in a communication device.

It should be noted that the segments 61, 62, 63, 64, 80, 81, 82 and 83 represent the direct paths of the sound waves emitted by the loudspeakers 40. The various reflections of these acoustic signals are not shown in FIG. 1 for reasons of clarity. It is nevertheless understood that the corresponding reflected signals are also processed by the communication device 10 according to the invention and more particularly when the automatic coupling determination algorithm, described below with reference to FIG. 5, is used in the invention.

Likewise, it should be noted that the paths of the sound waves emitted by the loudspeakers 40c and 40d of the communication device 10b to the microphone 50c of the communication device 10c are not reproduced in FIG. 1 for reasons of clarity. The same applies to the paths of the sound waves emitted by the loudspeakers 40e and 40f of the communication device 10c to the microphone 50b of the communication device 10b.

All these sound waves generate a cross echo and create interference on the communications of the communication devices 10 with their respective interlocutors.

Figure 2:
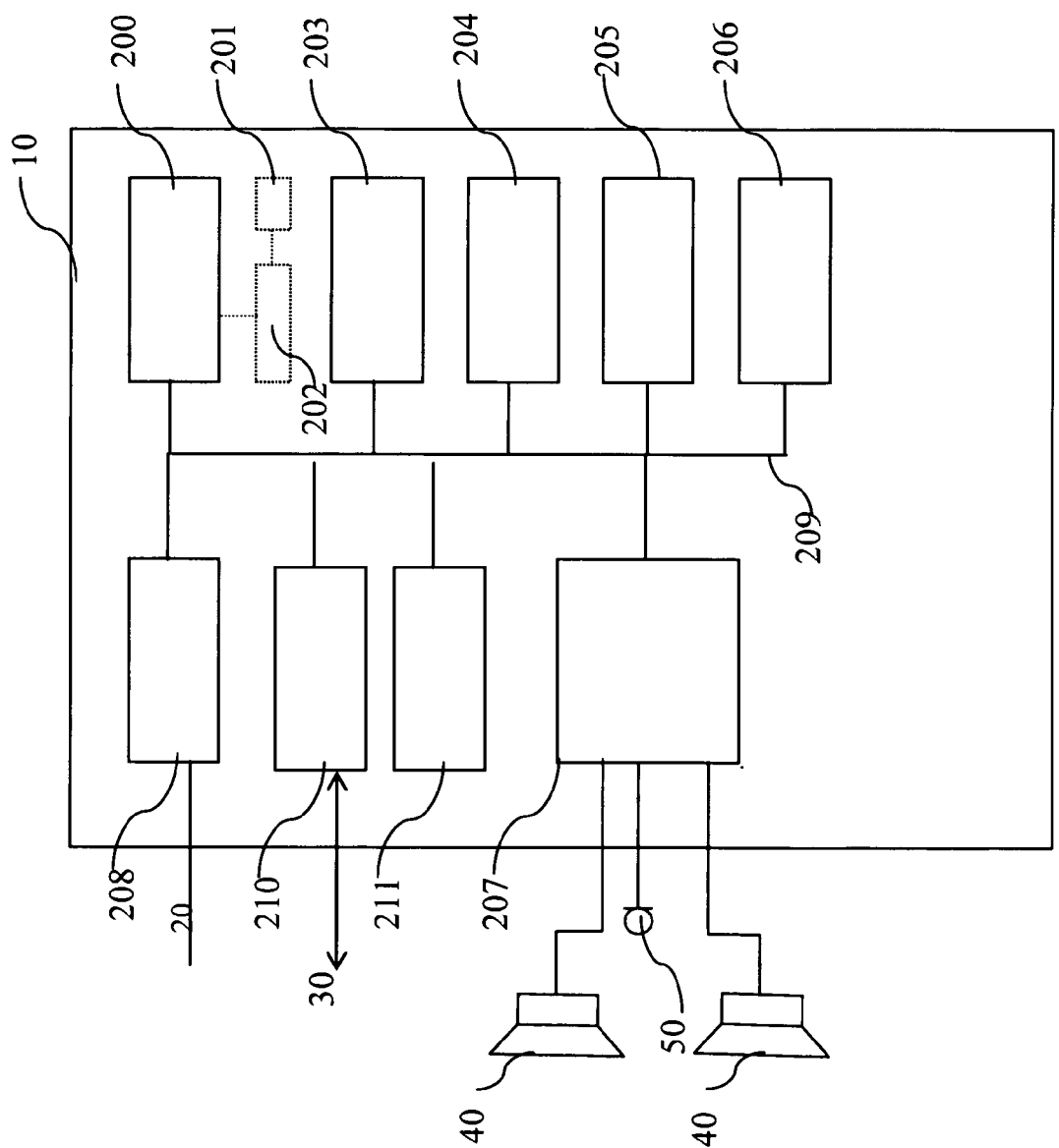
FIG. 2 depicts a communication device implementing the invention.

FIG. 2 depicts an example of a communication device 10 implementing the invention.

This device is adapted to determine weighting coefficients for each of the broadcasted signals 3 reproduced by each of its loudspeakers 40 according to the coupling separating these from a microphone 50 of a communication device 10 placed in the same 100, to weight the broadcasted signal reproduced by each of its loudspeakers 40 and to transmit the weighted signal reproduced by each of its loudspeakers 40 to at least one communication device 10 placed in the same premises 100 or to transmit the weighting coefficients, or even the broadcasted signal reproduced by each of its loudspeakers 40, to at least one other communication device 10 placed in the same premises 100.

The communication device 10 is also adapted either to receive the broadcasted signal reproduced by each of the loudspeakers 40 of the other communication devices 10 placed in the same premises 100 and their associated weighting coefficients, or to receive the weighted signal reproduced by each of the loudspeakers 40 of the other communication devices 10 placed in the same premises 100.

The communication device 10 is able to modify the picked-up sound signal issued from its microphone 50 from the weighting coefficients and a received signal or a received weighted signal, as will be explained below. The communication device 10 is for example a microcomputer comprising a communication bus 209 to which there are connected a processor 200, a read-only memory 204, a random-access memory 203, a screen 206, a keyboard 205, a hard disk 211, at least one network card 208 for communicating with the network 20, and an audio interface 207 to which the loudspeakers 40 and a microphone 50 are connected.

The hard disk 211 stores the program implementing the methods according to the invention and which will be described below. The hard disk 211 also comprises, according to a variant of the invention, data representing at least one electrical signal used to determine the coupling separating one of the loudspeakers 40 of the communication device from a microphone 50 of another communication device 10 placed in the same premises 100.

The hard disk also comprises at least one lookup table for determining the weighting coefficients according to the determined coupling.

The programs and the or each lookup table and the data are received via the communication network 20 and the network card 208, or are stored in the read-only memory 204.

When the communication device 10 is activated, the programs according to the present invention, the lookup table and the data are transferred into the random-access memory 203, which then contains an executable code according to the invention, and the registers containing the variables necessary for implementing the invention.

The communication device 10 also comprises, according to a variant of the invention, a counter 202 able to count the pulses of a clock 201.

The keyboard 205 and the screen 206 provide the man-machine interface with the user. Through the screen 206, the processor 200 invites the user of the communication device 10 to enter the number of other communication devices 10 present in the premises 100 and an identifier associated with each of the other communication devices 10. This identifier is for example the port number to which each communication device 10 is connected. The user supplies this information to the processor 200 by means of the keyboard 205.

By means of the screen 206, the processor 200 invites the user of the communication device 10 to enter the number of microphones 50 of each other communication device 10 present in the premises 100, and an identifier associated with each of the microphones 50. The user supplies this information to the processor 200 by means of the keyboard 205.

Finally, according to the preferred embodiment of the invention, the processor 200 invites the user of the communication device 10, by means of the screen 206, for each loudspeaker 40 of the communication device 10, to enter the coupling existing between each loudspeaker of the communication device 10 and each microphone 50 of each other communication device 10 present in the premises. For reasons of simplicity of implementation and understanding by the user, the processor 200 invites the user of the communication device 10 to enter the distance separating each loudspeaker 40 of the communication device 10 from each microphone 50 of each other communication device 10 present in the premises 100.

The user supplies this information to the processor 200 by means of the keyboard 205.

Naturally, according to the configuration of the premises 100 and the location of the various communication devices 10 with respect to one another, the user, if he judges it necessary, can also supply information representing multiple paths that he considers opportune.

It should be noted that this distance may be approximate. It does not need to be very precise for the invention to obtain satisfactory results.

Thus, according to a variant, the processor 200 invites the user of the communication device 10, by means of the screen 206, to enter only the coordinates of the microphones situated close, for example at a distance of 1 metre, to the loudspeakers 40 of the communication device 10.

Let us take by way of example the case corresponding to FIG. 1. Two "other" communication devices 10*b* and 10*c* each having two loudspeakers 40*c*, 40*d* and 40*e*, 40*f*, and a microphone 50*b* and 50*c*, have been indicated by the user of the communication device 10*a*.

The user of the communication device 10*a* has entered a distance of two metres between the loudspeaker 40*a* and the microphone 50*c*, a distance of one and a half metres between the loudspeaker 40*a* and the microphone 50*b*, a distance of two metres between the loudspeaker 40*b* and the microphone 50*c*, and a distance of one metre between the loudspeaker 40*b* and the microphone 50*b*.

Figures 6, 7:
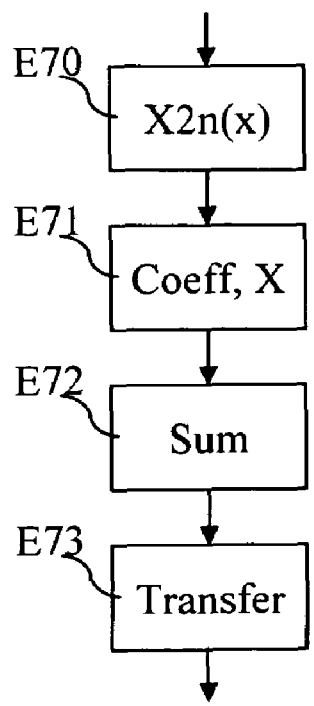
FIG. 6 depicts a lookup table for determining the weighting coefficients, according to the coupling determined.
FIG. 7 depicts an algorithm for transferring weighted signals issued from the loudspeakers equipping the communication devices.

The processor 200, from the distances entered, determines with the lookup table depicted in FIG. 6, for each of the distances separating each loudspeaker 40*a*, 40*b* from each of the microphones 50*b*, 50*c* of the other communication devices 10*b* and 10*c*, the coefficient to be applied to the signals delivered to each other communication device 10*b*, 10*c*.

In a variant, several lookup tables are stored in the read-only memory 204. These various tables correspond to different premises environments. This is because some premises comprise a highly reflective walls, a lookup taking account of the reflections of sound waves can thus be stored, as well as a table not taking these reflections into account.

Other tables can correspond to different locations of communication devices 10, with respect to one another, in the premises 100. This is because, the positioning of the communication device being liable to influence the reflected waves with respect to the direct waves, lookup tables taking into account the various positionings can also be stored.

Finally, other lookup tables can be stored, each of these tables being adapted to a surface area and/or to a volume of the premises 100.

The user, by means of the keyboard 205, then selects the lookup table appropriate to the environment in which he is situated, or the communication device 10 automatically determines the optimum lookup table according to responses from the user to predetermined questions.

In our example, the processor 200 stores the values of the following coefficients αxy; αac having the value 0.25, αab having the value 0.37, αbc having the value 0.25, and αbb having the value 0.25, where x represents the index of the loudspeaker 40 in question and y represents the index of the microphone 50 in question.

The communication device 10 also comprises an interface 210 allowing the reception, over the connections 30, of the weighted signals issued from the loudspeakers 40 of the other communication devices 10.

The interface 210 also allows the transfer of weighted signals issued from the loudspeakers 40 of the communication device 10, over the connections 30, to the other communication devices 10.

It should be noted that the signals received and transferred are digital signals.

This interface 210 is for example a network card of the Ethernet type or a connection of the RS232 type.

Figure 3:
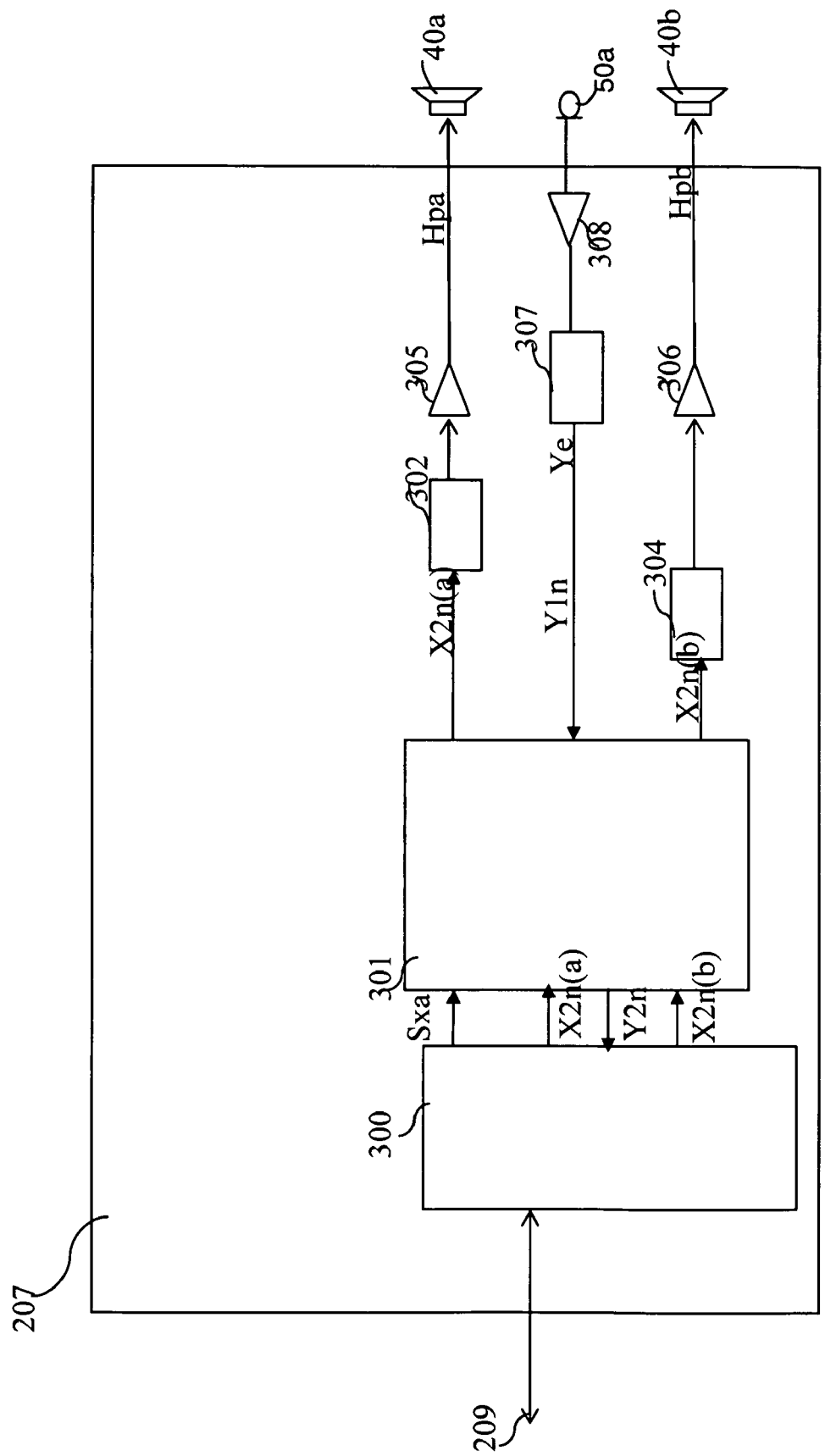
FIG. 3 depicts the audio interface of a communication device implementing the invention.

FIG. 3 depicts the audio interface of a communication device 10 implementing the invention.

By way of an example, a description will be given below of the audio interface subassembly 207 of the communication device 10*a*. The other communication devices 10*b* and 10*c* also comprise a similar audio interface 207, which will therefore not be described.

The audio interface 207 is connected to the communication bus 209 through an interface 300. The interface 300 provides, in addition to the conventional operations performed by a conventional audio interface, the separation, for each loudspeaker 40*a* and 40*b*, of the signals X2n(a) and X2n(b) received from the network 20*a*, by means of the network card 208.

It should be noted here that the separation of the signals received respectively for the loudspeakers 40*a* and 40*b* can also be provided by the processor 200 of the communication device 10*a*.

The audio interface 300 also provides the adding of the signals broadcasted by the other communication devices 10 present in the premises 100, as well as the transfer of the signal Sxa thus formed to the multichannel echo control module 301.

Thus the audio interface forms the signal Sxa such that:

$$Sxa = (\alpha ca X2n(c) + \alpha da X2n(d)) + (\alpha ea X2n(e) + \alpha fa X2n(f))$$

where:

αca is the weighting coefficient representing the coupling between the loudspeaker 40*c* and the microphone 50*a*, and X2n(c) the broadcasted signal reproduced by the loudspeaker 40*c*;

αda is the weighting coefficient representing the coupling between the loudspeaker 40*d* and the microphone 50*a*, and X2n(d) the broadcasted signal reproduced by the loudspeaker 40*d*;

αea is the weighting coefficient representing the coupling between the loudspeaker 40*e* and the microphone 50*a*, and X2n(e) the broadcasted signal reproduced by the loudspeaker 40*e*;

αfa is the weighting coefficient representing the coupling between the loudspeaker 40*f* and the microphone 50*a*, and X2n(f) the broadcasted signal reproduced by the loudspeaker 40*f*.

It should be noted here that the adding of the signals broadcasted by the loudspeakers of the other communication devices can also be effected by the processor 200.

The interface 300 also provides the transfer of the modified signal Y2n processed by the module 301 to the processor 200 with a view to a transmission thereof over the network 20.

The module 301 is a multichannel echo control module for the loudspeakers 40*a* and 40*b* and the microphone 50*a*. It will be described in more detail with reference to FIG. 4.

The echo control module 301 effects a processing on the signal Y1n so as to eliminate the echo due to the coupling between the loudspeakers 40*a* and 40*b* with the microphone 50*a*. The echo control module 301 also effects a processing on the signal Y1n so as to eliminate the echo due to the coupling between the loudspeakers of the other communication devices present in the premises 100 with the microphone 50*a* and thus forms a signal Y2n.

The echo control module 301 supplies two signals X2n(x), where x represents the index of the loudspeaker in question, denoted X2n(a) and X2n(b). These signals are referred to as broadcasted signals and are converted in the form of analogue signals respectively by analogue digital converters 302 and 304. The converted signals are then amplified by respective amplifiers 305 and 306 in order finally to be delivered to the loudspeakers 40*a* and 40*b*. The amplified signals are denoted Hpa for the signals delivered to the loudspeaker 40*a* and Hpb for the signals delivered to the loudspeaker 40*b*.

The audio interface 207 also comprises an amplifier 308 which amplifies the electrical signal generated by the microphone 50*a*. The amplified signal is then converted in the form of a digital signal, referred to as the picked-up signal, by an analogue to digital converter 307. The converted signal is then processed by the echo control module 301.

Thus the invention in a simple fashion eliminates all the negative effects related to the cross echo between several communication devices 10 placed in the same premises 100.

Figure 4:
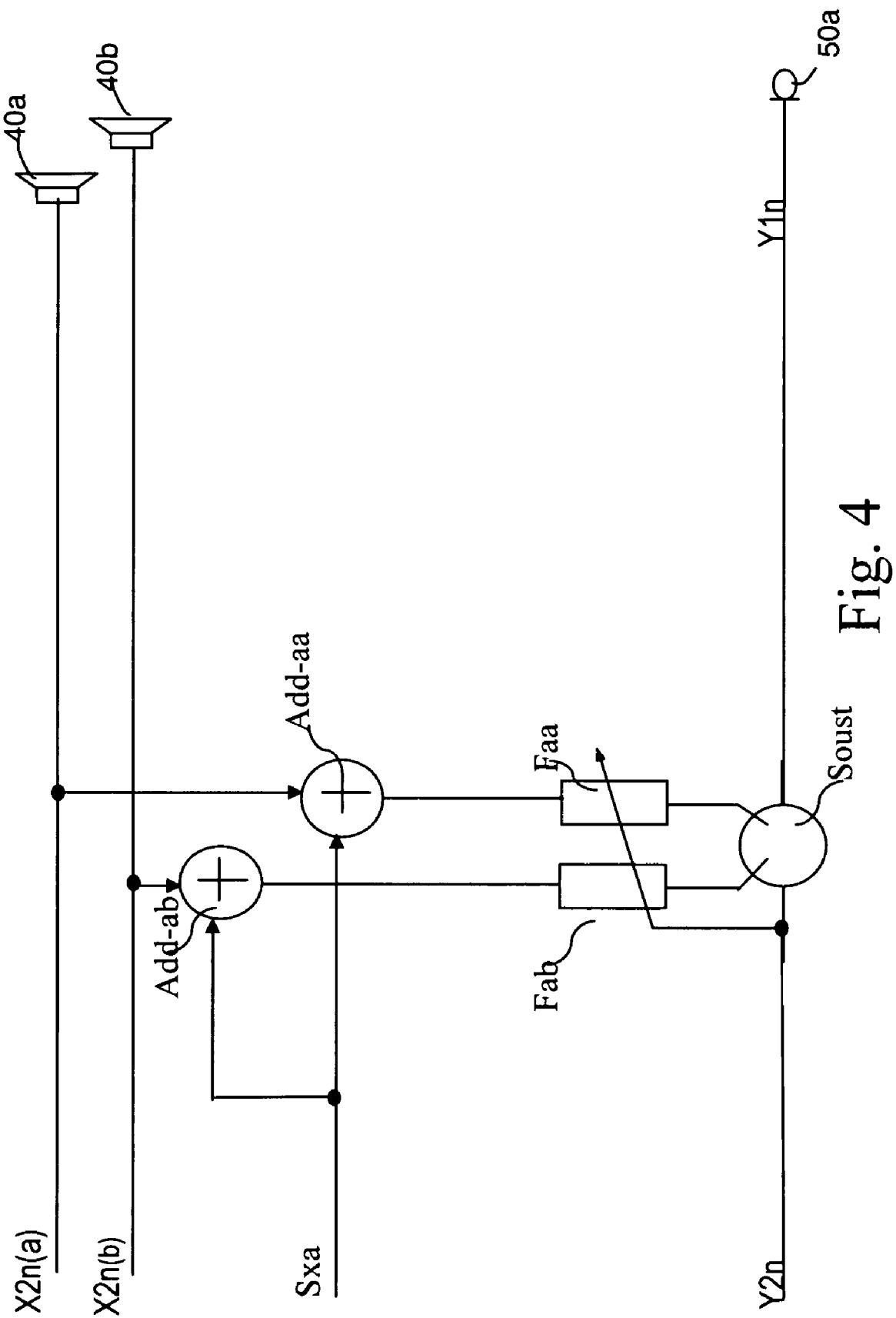
FIG. 4 depicts a multichannel echo control module for the loudspeakers and microphone.

FIG. 4 depicts the adaptive control module 301. This is a multichannel echo control device 301 used by the invention.

The echo control device 301 of the communication device 10*a* will be described by way of example. The other communication devices 10*b* and 10*c* comprise the same echo control device 301. They will therefore not be described.

The multichannel echo control device 301 comprises a plurality N of reception channels, N being an integer greater than or equal to 1, and a plurality M of transmission channels, M being an integer greater than or equal to 1.

In our example embodiment, N is equal to two and M is equal to one. Naturally, a greater number of loudspeakers 40 and microphones can be used in the context of the present invention.

Each of the two reception channels comprises a loudspeaker output transducer 40 which produces a sound pressure wave in response to an input signal X2n(x).

In addition, the transmission channel delivers the previously described signal Y1n.

The echo control device 301 comprises two adders denoted Add-aa and Add-ab.

The adder Add-aa effects the adding of the input signal X2n(a) and the signal Sxa which is the adding of the signals broadcasted by the other communication devices 10 present in the premises 100. The signal thus formed is the reference signal of the loudspeaker 40*a*, used by the identification filter Faa in order to modify the picked-up signal Y1n.

The adder Add-ab effects the adding of the input signal X2n(b) and signal Sxa which is the adding of the signals broadcasted by the other communication devices 10 present in the premises 100. The signal thus formed is the reference signal of the loudspeaker 40b, used by the identification filter Fab to modify the picked up signal Y1n.

The two variable-coefficient identification filters Faa and Fab estimate the impulse response of the premises in which the communication device is placed. This impulse response represents amongst other things the acoustic coupling between the various communication devices 10.

It also comprises, for each filter Faa and Fab, means (not shown) for matching the coefficients of the filter according to a matching step $\mu_x$ (x equal to a or b) and means (not shown) of calculating the matching step $\mu_x$.

Each filter Faa and Fab generates a filtering signal which is subtracted from the output signal Y1n by a subtractor denoted Soust in FIG. 4 in order to supply a filtered signal Y2n.

In accordance with the invention, the device also comprises means (not shown) for estimating the instantaneous power $P1n_{a,b}$ of each input signal $X2n(a)$ and the instantaneous power P2 of the output signal Y1n.

In a variant, the multichannel echo control device 301 is a device as described in the French patent application published under the reference FR2824982.

FIG. 5 depicts an automatic coupling determination algorithm used, according to a variant of the invention, in a communication device.

According to this variant, the user does not have to enter the distances separating the loudspeakers 40 of the communication device 10 from the microphones 50 of the other communication devices 10. The determination is made automatically by the communication device 10 of the user. According to this variant, all the disturbances relating to the couplings existing between the various loudspeakers and the microphones are determined.

At the launch of the application, the processor 200 reads, from the read-only memory 204 or hard disk 211, the instructions of the program corresponding to the steps E1 to E11 of FIG. 5 and loads them into random-access memory RAM 203 in order to execute them.

By way of an example, the process of the algorithm when it is carried out at the communication device 10a is described. The algorithm is carried out in the same way at the other communication devices 10b and 10c. They will therefore not be described.

At step E1, the processor 200 reads in the random-access memory 203 data previously entered by the user of the communication device 10a, this data being the number K of other communication devices 10b, 10c present in the room 100 and possibly the number of microphones 50 that each of these devices have available.

For reasons of simplification, each communication device 10b, 10c has only one microphone 50b, 50c. At the same step, the processor 200 initialises the counter 202 to the value zero and initialises a variable n to zero. The processor 200 also generates a message on the network 200 or through the connections 30a, 30c, intended for the other communication devices 10b and 10c in order to inform them that it is going to execute a distance evaluation procedure.

Once these operations have been performed, the processor 200 moves to step E2 and reads, from the read-only memory 204 or hard disk 211, the data representing a predetermined electrical signal. This signal is for example a mono-frequency audible signal. At the same step, the processor 200 transfers the data representing the predetermined signal to the sound card 207, which transfers for example this signal to the loudspeaker 40a.

Once these operations are performed, the processor 200 triggers at step E3 the counter 202 depicted in dotted lines in FIG. 2, which counts the number of pulses of the clock 201 depicted in dotted lines in FIG. 2. The clock 201 is for example a clock functioning at a frequency of 10 kHz.

The following step E4 is a loop awaiting a response from one of the other communication devices 10b, 10c to the sound signal generated by the loudspeaker 40a, at step E2.

The other communication devices 10b, 10c previously being informed of the distance evaluation procedure generate, at the reception of the signal generated by the loudspeaker 40a, a response message comprising amongst other things their identifier or the identifier of their microphone 50, on the network 20 or in a variant on the connections 30 connecting them to the communication devices 40a.

As long as a response is not received, the processor 200 remains in the waiting loop E4.

On reception of the first response (for example from the communication device 10b), the processor 200 moves to step E5, which consists of reading the current value of the counter 202.

Once the reading has been made, the processor 200 stores, at step E6, in the random-access memory 203, the identifier of the communication device 10b that replied, and the current value of the counter previously read at step E4.

Once this operation is performed, the processor 200 determines, at step E7, the weighting coefficient to be applied to the signal of the loudspeaker 40a that generated the sound signal and transferred to the microphone 50b of the communication device 10b that replied. The processor 200 then consults the lookup table depicted in FIG. 6, which makes it possible to determine the weighting coefficients according to the number of pulses stored at step E6.

The determination of the coefficient αxy is based on a calculation made from the speed of propagation of sound in air.

Once this operation is performed, the processor 200 moves to step E8 and stores the coefficient αxy determined and its value.

By way of example, the communication device 10b has generated a response message received by the communication device 10a at step E4, the counter 202 is at the value 45, and the coefficient αab is then equal to 0.37.

The processor 200, at the following step E9, increments the variable n by one unit and compares this with the number K.

The processor 200 at step E10 compares the variable n with K. If n is less than K, all the other communication devices have not replied to the sound signal generated at step E2, and the processor 200 then returns to step E4 and awaits a new response message from another communication device 10, in this case the communication device 10c.

Steps E4 to E9 are reiterated as many times as there exist other communication devices 10.

If n is equal to K, all the other communication devices 10 have replied to the message, in this case the communication device 10c. The processor 200 then moves to step E11 and then deactivates the counter 202.

Steps E1 to E11 are reiterated as many times as the communication device 10a has loudspeakers 40 and for each loudspeaker 40.

Thus steps E1 to E11 are reiterated a further time for the loudspeaker 40b of the communication device 10a.

Steps E1 to E11 are also reiterated as many times as there are microphones present in the premises 100. The steps are of course reiterated for each of the microphones 50.

In a variant, the communication device 10 generates a plurality of audible signals at different frequencies and determines a weighting coefficient for each of the frequencies. Steps E1 to E11 are then reiterated as many times as signals with different frequencies are generated.

Thus the weighting is adapted to the frequency spectrum. Weighting coefficients are then different if these are applied to the high frequencies or the low frequencies of the signals reproduced by the loudspeakers 40.

It should also be noted that this procedure can be carried out periodically or at the request of a user of the communication device 10.

It should be noted that the invention as described is implemented for each of the communication devices 10 placed in the same premises 100.

In a variant, prior to the transfer of the data representing the predetermined signal to the soundcard 207, at step E2, the processor 200 determines the response time over the respective connections 30a and 30c of the communication devices 10b and 10c. This is because, if the connections 30 are slow connections or the transmission speed fluctuates over time, such as a connection through a network of the Internet type, the automatic determination of the coupling may be disturbed. The processor 200 generates, on the connections 30a and 30b for example, signals conventionally known by the term ping, intended for other communication devices, awaits a response from the communication devices 10a and 10b and thus determines the transfer time over the network, by activating the clock 201 and the counter 202.

For each of the communication devices, the time measured will be subtracted from the value of the counter read at step E5.

According to another variant, the algorithm is reiterated so as to determine the echoes of the sound signal.

The other communication devices 10b, 10c generate, on reception of another signal, issued from the reflection by one of the elements of the premises 100, of the signal generated by the loudspeaker 40a, a response message comprising amongst other things their identifier or the identifier of their microphone 50, on the network 20 or, in a variant, on the connections 30 connecting them to the communication device 10a.

The processor 200 of the communication device 10a then receives, at step E4, coming from one of the other communication devices 10b, 10c, the message in response to the sound signal generated at step E2 by the loudspeaker 40a.

The processor 200 stores the various responses, determines which amongst the direct signal and the reflected signal is the most significant for each other communication device, and applies the coefficient which corresponds to the most significant signal, as the coefficient representing the coupling.

Naturally the variants mentioned above can also be combined with each other.

FIG. 6 depicts a lookup table for determining the weighting coefficients according to the coupling determined.

This table is a lookup table that permits the determination of the waiting coefficients $\alpha xy$ according to the coupling measured by the user.

This table is also a lookup table that permits the determination of the waiting coefficients $\alpha xy$ according to the number of pulses counted by the counter 202, when the invention comprises an automatic coupling measuring mode.

It should be noted that this table can comprise a large number of coupling and/or pulse values, so as to obtain increased precision.

This lookup table is for example a table stored in read-only memory 204. As mentioned before, several tables are stored in read-only memory 204. These various tables correspond to various premises environments such as premises comprising highly reflective walls, or to different locations of communication devices 10 with respect to one another in the premises 100, or are adapted to a surface area and/or a volume of the premises 100.

It should be noted that, in a variant embodiment, a table comprises weighting coefficients $\alpha xy$ all equal to a predetermined value, equal for example to the value of 1. This table is for example used during the installation of the system, prior to the determination of the couplings made, either by the user, or by automatic measurement of the couplings, according to the invention.

FIG. 7 depicts an algorithm for transfer of the weighted signals reproduced by the loudspeakers equipping the communication devices.

At the launch of the application, the processor 200 reads, from the read-only memory 204 or hard disk 211, the instructions of the program corresponding to steps E70 to E73 of FIG. 7, and loads them into random-access memory RAM 203 in order to execute them.

At step E70, the processor 200 obtains the signals $X2n(x)$ intended to be reproduced by each of the loudspeakers 40 of the communication device 10.

The processor obtains these signals either by interrogating the audio interface 207 or by reading them in the random-access memory RAM 203 if they have previously been stored. Once this step has been performed, at step E71, the processor 200 obtains the weighting coefficients $\alpha xy$ corresponding to the signals $X2n(x)$.

The processor 200, from the couplings, or more precisely the distances, previously entered by the user or the couplings determined in accordance with the algorithm in FIG. 5, determines with the lookup table shown in FIG. 6, for each of the couplings separating each of its loudspeakers 40 from each of the microphones 50 of the other communication devices 10, the coefficient to be applied to the signal or signals delivered to each other communication device 10.

For example, the processor 200 of the communication device 10a obtains the values of the following coefficients $\alpha xy$: $\alpha ac$ with the value 0.25, $\alpha ab$ with the value 0.37, $\alpha bc$ with the value 0.25, and $\alpha bb$ with the value 0.25.

Once this operation has been performed, the processes 200, at the same step E71, multiplies each of the signals obtained at step E70 by the weighting coefficient corresponding to the signal.

For example, the processor 200 of the communication device 10a multiplies the digital signal equivalent to the signal $X2n(a)$ by the coefficient $\alpha ac$, and the digital signal equivalent to the signal $X2n(b)$ by the coefficient $\alpha bc$.

The processor 200 of the communication device 10a multiplies the digital signal equivalent to the signal $X2n(a)$ by the coefficient $\alpha ab$ and the digital signal equivalent to the signal $X2n(b)$ by the coefficient $\alpha bb$.

Next, at step E72, the processor 200 of the communication device 10a adds the signals weighted by the coefficients $\alpha ac$ and $\alpha bc$ in order to form a signal Sac. The processor 200 of the communication device 10a also adds the signals weighted by the coefficients $\alpha ab$ and $\alpha bb$ in order to form a signal Sab.

The signal Sac is then equal to:

$$Sac = \alpha ac X2n(a) + \alpha bc X2n(b))$$

The signal Sab is then equal to:

$$Sab = \alpha ab X2n(a) + \alpha bb X2n(b))$$

Finally, the processor 200 of the communication device 10a moves to step E73, which consists of transferring the signals Sac and Sab to the interface 210 of the communication device 10a in FIG. 1. The signal Sac is then transferred over the connection 30c, whilst the signal Sab is then transferred over the connection 30a.

The algorithm as described is executed as long as signals are retranscribed by the loudspeakers 40 of the communication device 10.

The processor 200 of a communication device terminal receives, by means of the interface 210, weighted signals broadcasted by the other communication devices situated in the same premises, in accordance with the algorithm described previously with reference to FIG. 7. For example, in the case of the communication device 10a, the latter receives, via the connections 30a and 30c, the signals transmitted by the communication devices 10b and 10c. The signal Sba coming from the communication device 10b is for example equal to:

Sba=$\alpha$caX2n(c)+$\alpha$daX2n(d)), where X2n(c) and X2n(d) are the signals reproduced respectively by the loudspeakers 40c and 40d of the communication device 10b.

The signal Sca coming from the communication device 10c is for example equal to:

Sca=$\alpha$eaX2n(e)+$\alpha$faX2n(f)), where X2n(e) and X2n(f) are the signals reproduced respectively by the loudspeakers 40e and 40f of the communication device 10c.

On reception of these signals, the processor 200 transfers these signals to the echo control module 301 of the audio interface 207, by means of the interface 300. These signals are then processed in accordance with what was described above with reference to FIG. 4.

Figure 8:
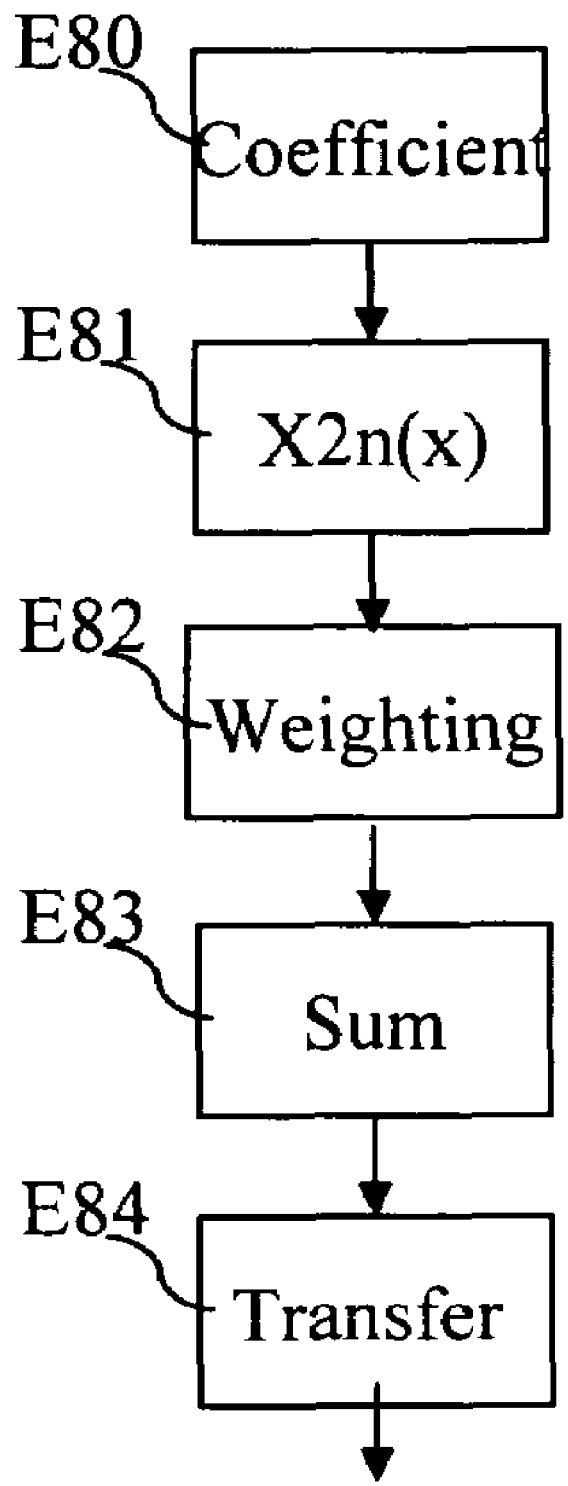
FIG. 8 depicts an algorithm for processing the signals supplied by the microphone of the communication device according to one variant.

FIG. 8 depicts an algorithm for processing the signals supplied by the microphone of a communication device, according to a variant.

At the launch of the application, the processor 200 of the communication device 10 reads, from the read-only memory 204 or hard disk 211, the instructions of the program corresponding to the steps E80 to E84 of FIG. 8 and loads them into random-access memory RAM 203 in order to execute them.

In this variant, the signals coming from the loudspeakers 40 of the other communication devices, which are received through the connections 30, are not weighted.

For example, the processor 200 of the communication device 10a obtains at step E80 the weighting coefficients $\alpha$xy previously determined for each of the loudspeakers 40 of the other communication devices.

They can be obtained in various ways: by reading in the random-access memory RAM 203 the coefficients $\alpha$xy previously transferred by the other communication devices or previously determined by the communication device 10a, or by interrogating for example a server which has these coefficients available by means of the network card 208.

At the following step, the processor 200 of the communication device 10a receives the signals reproduced by the loudspeakers 40c and 40d of the communication device 10b, by means of the interface 210 of the connection 30, as well as the signals reproduced by the loudspeakers 40e and 40f of the communication device 10c, by means of the interface 210 of the connection 30c.

Once this operation has been performed, the processor 200 of the communication device 10a weights at step E82 each of the signals issued from the loudspeakers 40c, 40d, 40e and 40f, by applying their respective coefficients $\alpha$xy.

Next, at step E83, the processor 200 adds the weighted signals in order to form a cross echo correction signal, Sxa.

At step E84, the processor 200 of the communication device 10a transfers the signal formed at the previous step E83 to the audio interface 207, and more precisely to the echo control module 301.

Thus the echoes coming from the other communication devices are eliminated.

Figure 9:
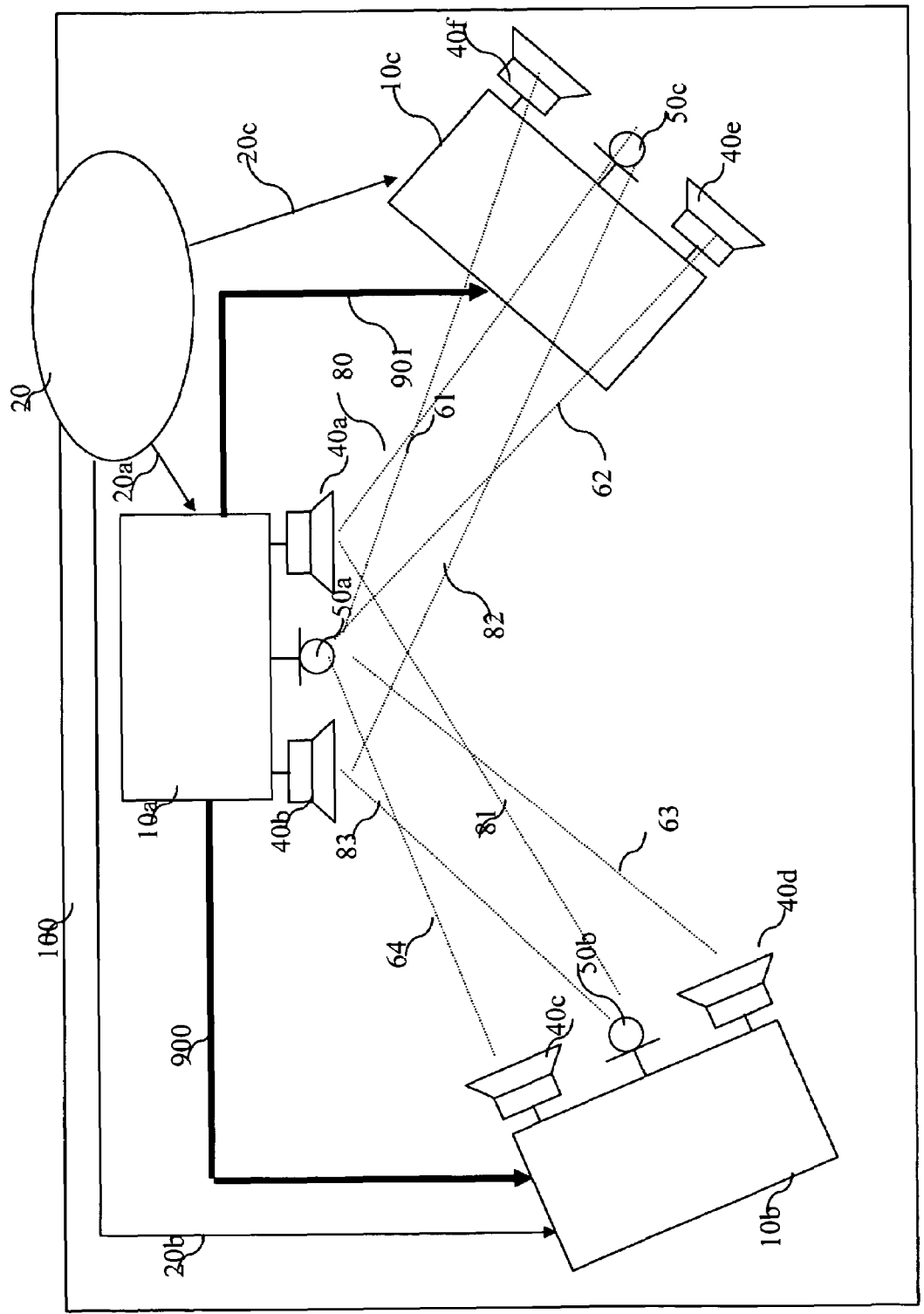
FIG. 9 depicts a second variant of a communication system according to the invention.

FIG. 9 depicts a second variant of a communication system according to the invention.

In the communication system in FIG. 1 described previously, each of the communication devices 10 determines the weighting coefficients to be applied to the signals reproduced by the respective loudspeakers 40, transfers the respective signals and the weighting coefficients or the respective weighted signals, to the other communication devices 10.

The communication system in FIG. 9 is identical to the communication system in FIG. 1 apart from the fact that the connections 30a, 30b and 30c are replaced by connections 900 and 901.

In this communication system, the communication device 10a is a master communication device, and the communication devices 10b and 10c are slave communication devices.

The connections 900 and 901 are for example connections of the Ethernet type. These connections can also be connections of the RS232 type, or can be replaced by the connections 20b and 20c. Naturally, other types of connection can be envisaged.

The communication device 10a is connected to the communication device 10b by means of a connection 900. This connection allows the transfer, from the communication device 10a to the communication device 10b, of the signals reproduced by the loudspeakers 40a, 40b, 40e and 40f previously weighted by a coefficient representing their respective distance from the microphone 50b.

The communication device 10a is connected to the communication device 10c by means of a connection 901. This connection allows the transfer, from the communication device 10a to the communication device 10c, of the signals reproduced by the loudspeakers 40a, 40b, 40c and 40d and previously weighted by a coefficient representing their respective distance from the microphone 50c.

This connection also allows the transfer, from the communication device 10a to the communication devices 10b and 10c, of predetermined signals adapted to automatic measurement or request for the generation of predetermined signals by the communication devices 10b and 10c for the automatic measurement of the couplings, as will be described subsequently with reference to FIG. 10.

This connection also allows the reception of information representing the reception, by the communication devices 10b and 10c, of predetermined signals adapted to the automatic measurement of the couplings.

The master communication device 10a has an architecture similar to the communication devices 10 previously described with reference to FIG. 2. It will therefore not be described further in detail.

The slave communication devices 10b and 10c have an architecture similar to the communication devices 10 previously described with reference to FIG. 2. They will therefore not be described further in detail.

Only the master device 10a implements the automatic coupling determination algorithm for all the loudspeakers 40 and all the microphones 50 of the communication devices 10.

The master communication device 10a obtains the signals reproduced by the loudspeakers 40c, 40d, 40e and 40f of the communication devices 10b and 10c, by means of the connections 900 and 901, and transfers the weighted signals from the loudspeakers 40 of the communication devices 10 to the other communication devices 10.

The slave communication devices 10b and 10c process the signals supplied by their respected microphones 50b and 50c in accordance with what was described in the first variant embodiment.

It should be noted that the communication device 10a can be integrated in an automatic exchange if the network 20 is a switched telephone network, or a server if the network 20 is a network of the Ethernet type.

It should also be noted that, in a variant, the communication device 10a comprises the audio interfaces 207 of the communication devices 10b and 10c and manages the tasks performed by these communication devices. Only the microphones 50b, 50c and the loudspeakers 40c, 40d, 40e and 40f are placed at different points in the premises 100. The integration of the communication devices 10b, 10c in a single communication device 10a thus makes it possible to reduce the cost of the system and also to dispense with delays related to the network.

Figure 10:
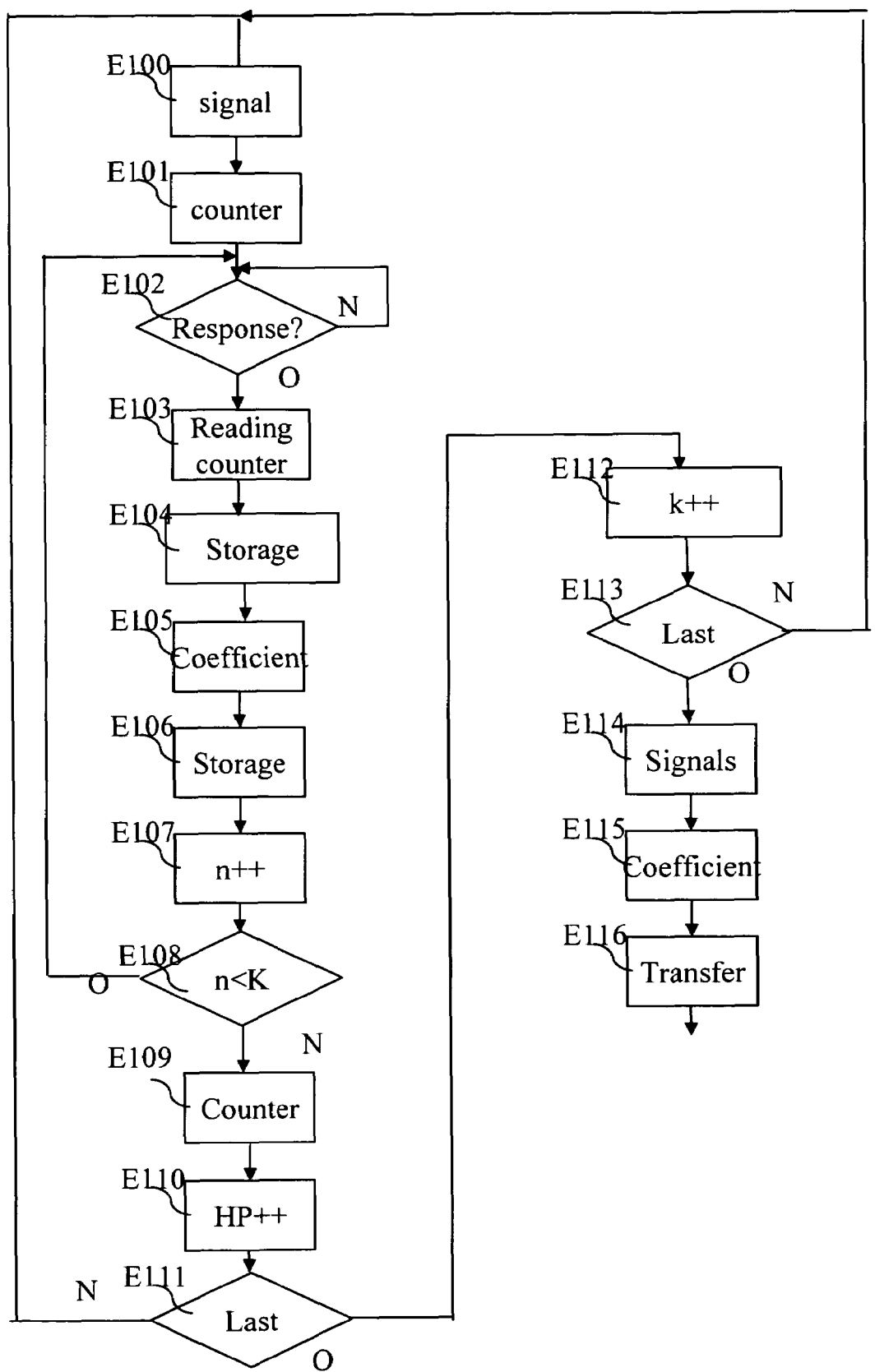
FIG. 10 depicts an algorithm for the automatic determination of coupling and for the transfer of the weighted signals issued from the loudspeakers of the communication device used in the second communication system variant.

FIG. 10 depicts an algorithm for the automatic determination of couplings and transfer of weighted signals issued from the loudspeakers of the communication devices, used in the second communication system variant.

At the launch of the application, the processor 200 of the master communication device 10a reads, from the read-only memory 204 or from the hard disk 211, the instructions of the program corresponding to steps E100 to E116 in FIG. 10, and loads them into random-access memory RAM 203 in order to execute them.

The processor 200 of the master communication device 10a knows the number of slave communication devices 10b and 10c present in the premises 100. It also knows the number of loudspeakers 40 of each of the communication devices 10.

The processor 200 of the master communication device 10a, prior to the execution of the flow diagram, initialises all the variables necessary for the running of the program as well as the counter 202. The processor 200 of the master communication device 10a also generates a message on the network 20 or by means of the connections 900 and 901, intended for the other communication devices 10b and 10c, informing them that it is going to execute a distance evaluation procedure.

The communication device 10a determines the weighting coefficients to be applied to the signals reproduced by its loudspeakers 40a and 40b in the same way as that described with reference to FIG. 5. This determination will therefore not be described any further in detail.

Once these operations have been performed, the processor 200 of the master communication device 10a moves to step E100 and reads, from the read-only memory 204 or from the hard disk 211, the data representing a predetermined electrical signal. This signal is for example a single-frequency audible signal. At the same step, the processor 200 of the master communication device 10a transfers the data representing the predetermined signal to a first slave communication device, for example to the communication device 10b. The communication device 10b transfers this signal to its sound card 207, which then for example transfers this signal to the loudspeaker 40c.

Once these operations have been performed, the processor 200 of the master communication device 10a triggers, at step E101, the counter 202 depicted in dotted lines in FIG. 2, which counts the number of pulses of the clock 201 depicted in dotted lines in FIG. 2.

The following step E101 is a loop awaiting a response from one of the other communication devices, to the sound signal generated by the loudspeaker 40c at step E100.

The other communication devices 10, in this case the communication device 10c, being previously informed of the distance evaluation procedure, generates, on reception of the signal generated by the loudspeaker 40c, a response message, on the network 20 or in a variant on the connection 901 connecting it to the communication device 10a, this response message comprising amongst other things its identifier or the identifier of its microphone 50c.

As long as a response is not received, the processor 200 of the communication device 10a remains in the waiting loop E102.

On reception of the first response, the processor 200 of the master communication device 10a moves to step E103, which consists of reading the current value of the counter 202.

Once the reading has been carried out, the processor 200 of the master communication device 10a stores at step E104 in the random-access memory 203 the identifier of the communication device 10c that replied, as well as the current value of the counter previously read at step E103.

The processor 200 of the master communication device determines at the following step E106 the weighting coefficient to be applied to the signal of the loudspeaker 40 that generated the sound signal, in this case the loudspeaker 40c, and the microphone 50c of the communication device 40c that replied. The processor 200 then consults the lookup table shown in FIG. 6, and uses it for determining the weighting coefficients according to the number of pulses stored at step E104.

The determination of the coefficient $\alpha xy$ is based on a calculation made from the speed of propagation of sound in air.

Once this operation has been carried out, the processor 200 of the master communication device 10a moves to step E107 and stores the coefficient $\alpha xy$ determined, in this case the coefficient $\alpha cc$ and its value.

The processor 200 of the master communication device, at the following step E107, increments the variable n by one unit and compares this with the number K of other communication devices.

The processor 200 of the master communication device compares the variable n with K at step E108. If n is smaller than K, not all the other communication devices have replied to the sound signal generated at step E100, and the processor 200 then returns to step E102 and awaits a new response message from another communication device 10.

It should be noted that, in our example, only the communication device 10c responds, and the processor therefore moves to the following step E109.

Step E109 consists, for the processor 200 of the master communication device 10a, of re-initialising the counter 202.

The following step consists, for the processor 200 of the master communication device 10a, of incrementing the variable HP by one unit.

Once this operation has been performed, the processor 200 of the master communication device 10a checks at step E111 whether the variable HP is less than the number of loudspeakers 40 available to the slave communication device 10b. In our example, the slave communication device 10b comprises two loudspeakers 40c and 40d, the processor returns to step E100 and a new signal is generated by a loudspeaker 40 of the slave communication device 10b. This loudspeaker 40 is in this case the loudspeaker 40d.

Steps E101 to E111 are then executed in the same way as those previously described.

At step E111, the variable HP is equal to the number of loudspeakers 40 available to the slave communication device 10*b*, the processor 200 of the master communication device 10*a* then moves to the following step E112.

Step E112 consists, for the processor 200 of the master communication device 10*a*, of incrementing the variable k by one unit.

Once this operation is performed, the processor 200 of the master communication device 10*a* checks at step E113 whether the variable k is less than the number of slave communication devices 10*b*, 10*c* present in the premises 100.

In our example, the premises 100 comprising two slave communication devices, the processor 200 of the master communication device 10*a* returns to step E100 and a new signal is generated by a loudspeaker 40 of the slave communication device 10*c*. This loudspeaker 40 is in this case the loudspeaker 40*e*.

Steps E101 to E113 are then executed in the same way as those previously described.

At step E113, the variable k is equal to the number of communication devices 10*b*, 10*c* present in the premises 100, and the processor 200 of the master communication device 10*a* moves to the following step E114.

Step E114 consists of obtaining the signals reproduced by the various loudspeakers 40. The processor 200 of the master communication device 10*a* for this purpose obtains these signals by means of the connections 900 and 901. If for example the master communication device is integrated in an automatic exchange by a server, the processor 200 obtains these signals from the network 20.

Once this operation is performed, the processor 200 of the master communication device 10*a* applies the coefficient stored at step E107 to the respective signals and transfers these weighted signals to the slave communication devices 10*b* and 10*c*.

In a variant, prior to step E100, the processor 200 determines the response time by the connection 900 and 901 of the communication devices 10*b* and 10*c*. This is because, if the connections 900 are slow connections or the transmission speed fluctuates over time, such as a connection by means of a network of the Internet type, the automatic determination of the coupling may be disturbed. The processor 200 generates on the connections 900 and 901 for example signals conventionally known by the term ping intended for the other communication devices, awaits a response from the communication devices 10*a* and 10*b* and thus determines the transfer time over the network, for example, by actuating the clock 201 and the counter 202.

For each of the communication devices, the time measured will be deducted from the value of the counter read at step E103.

According to another variant, the algorithm is reiterated so as to determine the echoes of the sound signal.

The other communication devices 10*b*, 10*c* generate, on reception of another signal issued from the reflection, by one of the elements of the premises 100, of the signal generated by a loudspeaker 40, a response message comprising amongst other things their identifier or the identifier of their microphone 50, on the network 20 or in a variant on the connections 900 and 901 connecting the devices 10*b* and 10*c* to the communication device 10*a*.

The processor 200 of the master communication device 10*a* then receives at step E102 a response from one of the other communication devices 10*b*, 10*c* to the sound signal generated by a loudspeaker 40, at step E100.

The processor 200 stores the various responses, determines which amongst the direct signals and the reflected signals is the most significant for each other communication device, and applies the coefficient corresponding to the most significant signal as a coefficient representing the coupling.

In a variant, the processor 200 of the master communication device 10*a*, step E100, stores in memory a predetermined voice message with a duration of around a few seconds and transfers it to another communication device, in this case the communication device 10*b*. The communication device 10 then generates this signal by means of its loudspeaker 40*c*.

The other communication devices 10, in this case the communication device 10*c*, being previously informed of the distance evaluation procedure, stores in its random-access memory 203 the signal picked up by its microphone 50*c*. At the end of reception of this signal, the communication device 10*c* transfers, by means of the connection 901, in a response signal, the signal that it previously stored, to the communication device 10*a*.

The processor 200 of the master communication device 10*a*, on reception of this signal, effects a convolution product between this received message and the predetermined voice message.

Naturally, this process is reiterated as many times as the number of loudspeakers equipping each of the communication devices 10. This process is also reiterated as many times as the number of microphones equipping each of the communication devices.

By virtue of this convolution product, the communication device 10*a* is then able to determine all the parameters of couplings between the devices 10*b* and 10*c*, according to our example. Thus the distance separating each loudspeaker from each microphone can be evaluated, the various reflections of the signals generated by each loudspeaker can also be determined, according to the various frequencies of the voice announcement.

Naturally the communication device 10*a* takes into account in this determination the time for processing this data, and the propagation time for the signals in the connections 900 and 901.

Naturally the variants previously mentioned can also be combined with each other.

Naturally the present invention is in no way limited to the embodiments described here but quite the contrary encompasses any variant within the capability of a person skilled in the art.

The invention claimed is:

1. A communication device for connection to a telecommunication network for communicating with at least one distant interlocutor, having at least one loudspeaker and at least one microphone, the communication device comprising:

echo processing means for attenuating coupling due to a signal emitted by at least one loudspeaker of at least one other communication device situated close to said communication device, said echo processing means including:

(a) a receiver for receiving from said at least one other communication device information representative of a signal emitted by at least one loudspeaker of said at least one other communication device, the receiver being arranged to be responsive to the information via a digital connection distinct from said telecommunication network, all the communication devices being situated in the same premises and connected to one another through digital connections, (b) means for obtaining a piece of information representative of a distance separating a loudspeaker of one of said at least one other communication device from a microphone of said communication device, (c) means for determining weighting coefficients to be applied to each of the broadcasted signals reproduced by each of the loudspeakers of said at least one other communication device, taking account of said pieces of information representative of the distance, (d) an audio interface for:
(i) weighting said of at least one broadcasted signal received by a microphone of said communication device, using said weighting coefficients and thus providing a signal Sxa corresponding to the adding of the signals broadcasted by the other telecommunication devices;
(ii) adding said signal Sxa to an input signal received by one of said at least one loudspeaker of said communication device, thus providing for a reference signal of said one loudspeaker, (e) an echo control module modifying a signal Y1n picked-up by one of said at least one microphone of the communication device, as a function of said reference signal, and providing a modified signal Y2n; and (f) an interface for transferring the modified signal, with a view to a transmission thereof over the telecommunication network.

2. The device according to claim 1, further including a controller for controlling echo between at least one of the loudspeakers and at least one microphone of the communication device.

3. The device according to claim 1 wherein the information received representing at least one broadcasted signal from at least one other communication device was previously weighted by a coefficient representing the distance between a loudspeaker of the said at least one other communication device and the microphone of the communication device.

4. The device according to claim 3, wherein the signal processing arrangement for modifying the picked up signal is arranged to modify the picked up signal according to the weighted broadcasted signal of at least one other communication device in the reference echo control signal of the communication device.

5. A system including a plurality of the devices of claim 1 wherein the distinct connection is arranged for coupling a wave including the information and an electric component, and the local communication devices are close enough to each other that acoustic waves are coupled between the microphones and loudspeakers of the local communication devices.

6. An echo processing device adapted to be coupled to a communication device adapted to be connected to a telecommunication network for communicating with at least one distant interlocutor, having at least one loudspeaker and at least one microphone, the echo processing device being arranged to attenuate coupling due to a signal emitted by at least one loudspeaker of at least one other communication device situated close to said communication device, said echo processing device including:

a receiver for receiving from said at least one other communication device information representative of a signal emitted by at least one loudspeaker of said at least one other communication device, the receiver being arranged to be responsive to the information via a digital connection distinct from said telecommunication network, all the communication devices being situated in the same premises and connected to one another through digital connections, a processor arrangement for: (a) obtaining a piece of information representative of a distance separating a loudspeaker of one of said at least one other communication device from a microphone of said communication device, (b) determining weighting coefficients to be applied to each of the broadcasted signals reproduced by each of the loudspeakers of said at least one other communication device, taking account of said pieces of information representative of the distance, (c) weighting said of at least one broadcasted signal received by a microphone of said communication device, using said weighting coefficients and thus providing a signal Sxa corresponding to the adding of the signals broadcasted by the other telecommunication devices; (d) adding said signal Sxa to an input signal received by one of said at least one loudspeaker of said communication device, thus providing a reference signal of said one loudspeaker, (e) an echo control module modifying a signal Y1n picked-up by one of said at least one microphone of the communication device, as a function of said reference signal, and providing a modified signal Y2n; and (f) an interface for transferring the modified signal, with a view for transmission thereof over the telecommunication network.

7. The device according to claim 6, wherein the echo processing device also comprises circuitry for obtaining information representing the distance between at least one loudspeaker of the said at least one communication device and the microphone of the other communication device.

8. The device according to claim 7, wherein the signal processing arrangement is arranged for weighting the information representing the broadcasted signal of the communication device by coefficients associated with information representing the distance between at least one loudspeaker of the said at least one communication device and the microphone of the other communication device.

9. The device according to claim 8, wherein the communication device comprises a plurality of loudspeakers coupled with the at least one communication device so that (a) the signals reproduced by each loudspeaker of the at least one communication device are weighted by respective coefficients representing the distances between each loudspeaker of the communication device and the microphone of the other communication device and (b) the weighted signals are added.

10. The device according to claim 6, wherein the circuitry is arranged for establishing the number of other communication devices and for establishing the number of loudspeakers of the other communication devices.

11. The device according to claim 10, wherein the echo processing device also comprises:
a generator for generating at least one predetermined audible signal,
a receiver for receiving, by way of the connection with at least one other device, information representing the reception of the audible signal by at least one other device,
the signal processing arrangement being arranged for determining the distance between a loudspeaker of the said communication device and the microphone of at least one other communication device.

12. A system including a plurality of the devices of claim 6 wherein the distinct connection is arranged for coupling a wave including the information and an electric component, and the local communication devices are close enough to each other that acoustic waves are coupled between the microphones and loudspeakers of the local communication devices.

13. A method of processing an echo in a communication device for connection to a telecommunication network that communicates with at least one distant interlocutor, having at least one loudspeaker and at least one microphone, the echo processing attenuating the coupling due to a signal emitted by at least one loudspeaker of at least one other communication device situated close to said communication device, said echo processing method including:

(a) receiving from said at least one other communication device information representative of a signal emitted by at least one loudspeaker of said at least one other communication device, the information being received via a digital connection distinct from said telecommunication network, all the communication devices being situated in the same premises and connected to one another through digital connections, (b) obtaining a piece of information representative of a distance separating a loudspeaker of one of said at least one other communication device from a microphone of said communication device, (c) determining weighting coefficients to be applied to each of the broadcasted signals reproduced by each of the loudspeakers of said at least one other communication device, taking account of said pieces of information representative of the distance, (d) weighting said of at least one broadcasted signal received by a microphone of said communication device, using said weighting coefficients and thus providing a signal Sxa corresponding to the adding of the signals broadcasted by the other telecommunication devices;

(e) adding said signal Sxa to an input signal received by one of said at least one loudspeaker of said communication device, thus providing for a reference signal of said one loudspeaker, (f) modifying a signal Y1n picked-up by one of said at least one microphone of the communication device, as a function of said reference signal, and providing a modified signal Y2n; and (g) transferring the modified signal, with a view to a transmission thereof over the telecommunication network.

14. Echo processing method according to claim 13, wherein the received information representing at least one broadcast signal of at least one other communication device is weighted by a coefficient representing the distance between a loudspeaker of the at least one other communication device and the microphone of the communication device.

15. Echo processing method according to claim 14, wherein the picked up weighted signal is taken into account in a reference echo control signal of the communication device.

16. An information medium storing a computer program for causing a computer to perform the steps of claim 13.

17. The method of claim 13 wherein the method is performed at each of the local communication devices, the distinct connection couples a wave including the information and an electric component, and the location communication devices are close enough to each other that acoustic waves are coupled between the microphones and loudspeakers of the location communication devices.

18. Method of processing an echo between at least two local communication devices close to one another and coupled by a telecommunication network in order to attenuate, in a signal picked up by at least one microphone of another of said at least two local communication devices including at least one microphone, the components of a signal broadcast by at least one loudspeaker of at least one communication device, the echo processing method comprising the steps of:

(a) obtaining a piece of information representative of a distance separating a loudspeaker of one of said at least one other communication device from a microphone of said communication device, (b) determining weighting coefficients to be applied to each of the broadcasted signals reproduced by each of the loudspeakers of said at least one other communication device, taking account of said pieces of information representative of the distance, (c) weighting said of at least one broadcasted signal received by a microphone of said communication device, using said weighting coefficients and thus providing a signal Sxa corresponding to the adding of the signals broadcasted by the other telecommunication devices;

transferring, by use of a dedicated connection with at least one of the other local communication devices, the information obtained, the dedicated connection being distinct from said telecommunication network.

19. Echo processing method according to claim 18, wherein the method also comprises obtaining information representing the distance between at least one loudspeaker of the at least one communication device and the microphone of the other communication device.

20. Echo processing method according to claim 19, wherein the echo processing method also comprises weighting the information representing the broadcast signal of the communication device by coefficients associated with the information representing the distances between at least one loudspeaker of said at least one communication device and the microphone of the other communication device.

21. Echo processing method according to claim 19, wherein (a) the communication device comprises a plurality of loudspeakers, and (b) the signals reproduced by each loudspeaker of the said at least one communication device are weighted by respective coefficients representing the distance between each loudspeaker of the communication device and the microphone of the other communication device, and (c) the weighted signals are added.

22. Echo processing method according to claim 18, wherein the echo processing method also comprises determining the number of other communication devices and determining the number of loudspeakers of the other communication devices.

23. Echo processing method according to claim 22, wherein the echo processing method also comprises:
generating at least one predetermined audible signal,
receiving, via a connection, distinct from said telecommunication network, with at least one other device, information representing the reception of the audible signal by the at least one other device, and
determining the distance between the loudspeaker of the said communication device and the microphone of at least one other communication device.

24. An information medium storing a computer program for causing a computer to perform the steps of claim 18.

25. The method of claim 18 wherein the method is performed at each of the local communication devices, the distinct connection couples a wave including the information and an electric component, and the location communication devices are close enough to each other that acoustic waves are coupled between the microphones and loudspeakers of the location communication devices.

* * * * *